United States Patent
Yin et al.

(10) Patent No.: US 10,135,740 B2
(45) Date of Patent: Nov. 20, 2018

(54) METHOD AND APPARATUS FOR LIMITING RATE BY MEANS OF TOKEN BUCKET, AND COMPUTER STORAGE MEDIUM

(71) Applicant: Sanechips Technology Co.,Ltd., Shenzhen (CN)

(72) Inventors: Junjie Yin, Shenzhen (CN); Hongguang Pang, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 109 days.

(21) Appl. No.: 15/301,323

(22) PCT Filed: Sep. 22, 2014

(86) PCT No.: PCT/CN2014/087112
§ 371 (c)(1),
(2) Date: Oct. 17, 2016

(87) PCT Pub. No.: WO2015/149488
PCT Pub. Date: Oct. 8, 2015

(65) Prior Publication Data
US 2017/0026295 A1    Jan. 26, 2017

(30) Foreign Application Priority Data
Apr. 3, 2014 (CN) .......................... 2014 1 0134335

(51) Int. Cl.
*H04L 12/819* (2013.01)
*H04L 12/26* (2006.01)
*H04L 12/801* (2013.01)
*H04L 12/851* (2013.01)

(52) U.S. Cl.
CPC ........ *H04L 47/215* (2013.01); *H04L 43/0894* (2013.01); *H04L 43/16* (2013.01); *H04L 47/12* (2013.01); *H04L 47/24* (2013.01)

(58) Field of Classification Search
CPC .................................................... H04L 47/215
USPC ......................................................... 370/235
See application file for complete search history.

(56) References Cited

U.S. PATENT DOCUMENTS

2006/0133219 A1    6/2006    Le Faucheur

FOREIGN PATENT DOCUMENTS

| CN | 101227410 A | 7/2008 |
| CN | 101478491 A | 7/2009 |
| CN | 101741603 A | 6/2010 |

OTHER PUBLICATIONS

Supplementary European Search Report in European application No. 14887743.4, dated Apr. 3, 2017.
(Continued)

*Primary Examiner* — Shripal K Khajuria
(74) *Attorney, Agent, or Firm* — Oppedahl Patent Law Firm LLC

(57) ABSTRACT

Provided is a token-bucket-based rate limiting method and apparatus, and a computer storage medium. The method includes that: network node equipment acquires a token bucket parameter according to an attribute of a message, then obtains a current token amount according to a time threshold and the token bucket parameter, compares the current token amount with a current message length, and processes the message according to a comparison result.

14 Claims, 3 Drawing Sheets

(56) References Cited

OTHER PUBLICATIONS

International Search Report in international application No. PCT/CN2014/087112, dated Jan. 4, 2015.
English Translation of the Written Opinion of the International Search Authority in international application No. PCT /CN2014/087112, dated Jan. 4, 2015.

METHOD AND APPARATUS FOR LIMITING RATE BY MEANS OF TOKEN BUCKET, AND COMPUTER STORAGE MEDIUM

TECHNICAL FIELD

The present disclosure relates to the field of Quality of Service (QoS) of a data network, and in particular to a method and apparatus for limiting rate by means of token a bucket, and a computer storage medium.

BACKGROUND

In an existing data network, burstiness of message traffic may usually cause network congestion. A method for avoiding network congestion is implemented as follows: a rate of a message is limited at a receiver, and if the rate of the message is lower than a specified rate, the message is normally received; and if the rate of the message exceeds the specified rate, the message is dropped.

An existing method is to limit a rate of a message by virtue of a token bucket. A token bucket algorithm has standards RFC2687 and RFC2698, i.e. single-rate three-color dual-bucket and dual-rate three-color dual-bucket. FIG. 1 is a diagram of existing token-bucket-based rate limiting, in which when a message arrives, a system determines a time difference between the current message and a last message, then multiplies the time difference by an addition rate of tokens in a token bucket to obtain the number of filled tokens of the current token bucket, and finally adds the filled tokens and original tokens to obtain the number of tokens of the current token bucket until the current token bucket is full.

However, a rate of a message is usually higher than an addition rate of tokens during a practical application, so that a token bucket is in an "empty" state for a long time. Accordingly, tokens remaining in the token bucket generally enable short packets to pass only, while long packets are dropped. Therefore, rate limiting quality of long packets cannot be guaranteed.

SUMMARY

In order to solve the existing problem, the present disclosure mainly provides a token-bucket-based rate limiting method and apparatus, and a computer storage medium.

The technical solutions of the present disclosure are implemented as follows.

An embodiment of the present disclosure provides a token-bucket-based rate limiting method, which may include that:

network node equipment acquires a token bucket parameter according to an attribute of a message;

a current token amount is determined according to a time threshold and the token bucket parameter; and the current token amount is compared with a current message length to obtain a comparison result, and the message is processed according to the comparison result.

In the solution, the step that the network node equipment acquires the token bucket parameter according to the attribute of the message may include that: the network node equipment finds the token bucket parameter contained in a message data packet according to an index of the message data packet, wherein the token bucket parameter may include: a token addition rate, arrival time of a last message, a token amount after rate limiting operation is performed by a token bucket over the last message, and a token bucket size.

In the solution, the step that the current token amount is obtained according to the time threshold and the token bucket parameter may include that: the network node equipment determines a time difference according to arrival time of a last message in the token bucket parameter; a token addition at arrival time of the current message is determined according to the time threshold, the time difference and a token addition rate in the token bucket parameter; and the current token amount is determined according to the token addition at the arrival time of the current message and according to a token amount in the token bucket parameter after the rate limiting operation is performed over the last message.

In the solution, the step that the network node equipment determines the time difference may include: the arrival time of the last message is subtracted from the arrival time of the current message to obtain the time difference.

In the solution, the step that the token addition at the arrival time of the current message is obtained according to the time threshold and the time difference may include: the time threshold and the time difference are compared, and when the time difference is larger than the time threshold, the token addition at the arrival time of the current message is equal to a product of the time difference and the token addition rate; and when the time difference is smaller than or equal to the time threshold, the token addition at the arrival time of the current message is equal to 0.

In the solution, the step that the current token amount is obtained according to the token addition at the arrival time of the current message may include: the current token amount is equal to a sum of the token amount after the rate limiting operation is performed by the token bucket over the last message and the token addition at the arrival time of the current message, and a maximum value of the current token amount is a token bucket size in the token bucket parameter.

In the solution, the step that the current token amount is compared with the current message length to obtain the comparison result and the message is processed according to the comparison result may include that: the current token amount is compared with the current message length; when the current token amount is larger than or equal to the current message length, the current message is forwarded, and the number of token(s) equal to the current message length is subtracted from the current token amount of a token bucket; and when the current token amount is smaller than the current message length, the message is dropped, and the current token amount of the token bucket is kept unchanged.

An embodiment of the present disclosure further provides a token-bucket-based rate limiting apparatus, which may include: a parameter acquisition module, a determination module and a message processing module, wherein the parameter acquisition module may be configured to acquire a token bucket parameter according to an attribute of a message;

the determination module may be configured to determine a current token amount according to a time threshold and the token bucket parameter; and the message processing module may be configured to compare the current token amount with a current message length to obtain a comparison result, and process the message according to the comparison result.

In the solution, the parameter acquisition module may be configured to find the token bucket parameter contained in a message data packet according to an index of the message data packet, wherein the token bucket parameter may include: a token addition rate, arrival time of a last message, a token amount after rate limiting operation is performed by a token bucket over the last message, and a token bucket size.

In the solution, the determination module may include: a time difference determination module, a token addition determination module and a token amount determination module, wherein the time difference determination module may be configured to determine a time difference according to arrival time of a last message in the token bucket parameter;

the token addition determination module may be configured to determine a token addition at arrival time of the current message according to the time threshold, the time difference and a token addition rate in the token bucket parameter; and the token amount determination module may be configured to determine the current token amount according to the token addition at the arrival time of the current message and according to a token amount in the token bucket parameter after rate limiting operation is performed over the last message.

In the solution, the time difference determination module may be configured to subtract the arrival time of the last message from the arrival time of the current message to obtain the time difference.

In the solution, the token addition determination module may specifically be configured to compare the time threshold with the time difference; when the time difference is larger than the time threshold, multiply the time difference and the token addition rate to obtain the token addition at the arrival time of the current message; and when the time difference is smaller than or equal to the time threshold, determine that the token addition at the arrival time of the current message is equal to 0.

In the solution, the token amount determination module may be configured to add the token amount after the rate limiting operation of the token bucket over the last message and the token addition at the arrival time of the current message to obtain the current token amount, and determine that a maximum value of the current token amount is a token bucket size in the token bucket parameter.

In the solution, the message processing module may be configured to compare the current token amount with the current message length; when the current token amount is larger than or equal to the current message length, forward the current message, and subtract the number of token(s) equal to the current message length from the current token amount of a token bucket; and when the current token amount is smaller than the current message length, drop the message, and keep the current token amount of the token bucket unchanged.

An embodiment of the present disclosure provides a computer storage medium, in which a computer program may be stored, the computer program being configured to execute the abovementioned token-bucket-based rate limiting method.

According to the token-bucket-based rate limiting method and apparatus provided by the embodiments of the present disclosure, network node equipment acquires a token bucket parameter according to an attribute of a message, then obtains a current token amount according to a preset time threshold and the token bucket parameter, compares the current token amount with a current message length, and processes the message according to the comparison result. In such a manner, the problem that the token bucket is in an "empty" state for a long time may be solved, equal token service opportunities may be provided for long and short message packets, and the QoS of long packets may be improved.

DETAILED DESCRIPTION

In the embodiments of the present disclosure, network node equipment acquires a token bucket parameter according to an attribute of a message, then obtains a current token amount according to a preset time threshold and the token bucket parameter, compares the current token amount and a current message length, and processes the message according to a comparison result.

The present disclosure will be further described below with reference to the drawings and specific embodiments in detail.

Figure 1:
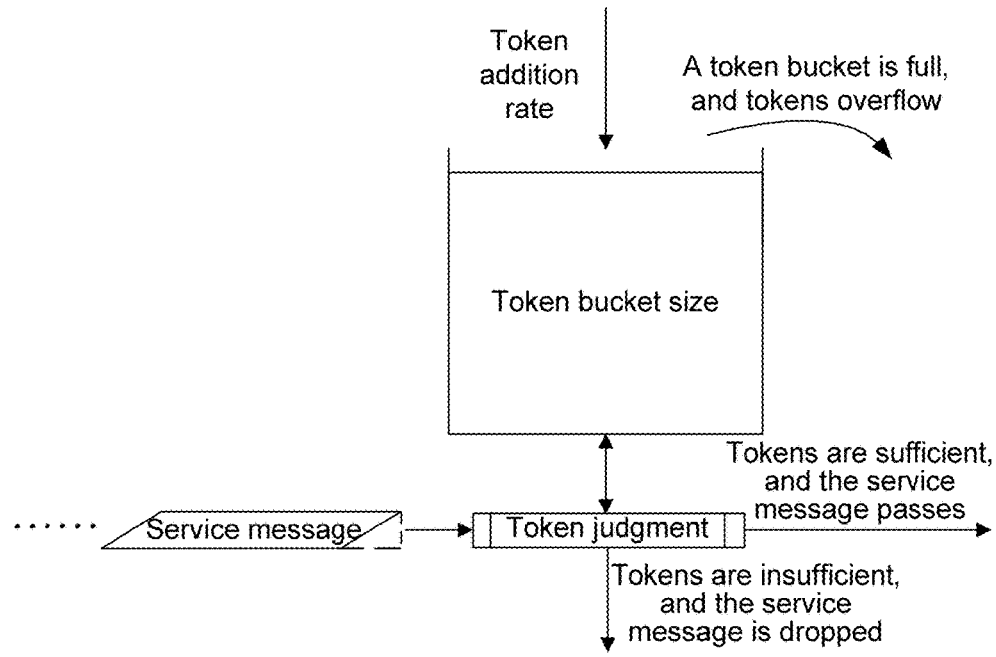
FIG. 1 is a diagram of existing linear token-bucket-based rate limiting.
Figure 2:
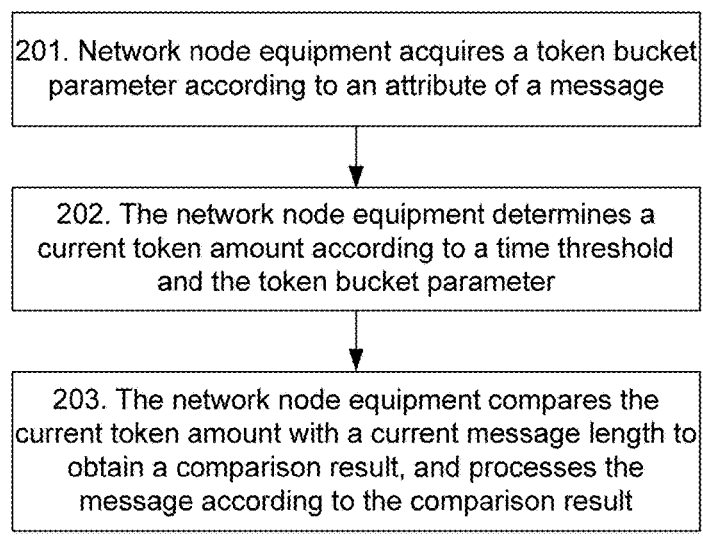
FIG. 2 is a flowchart of a token-bucket-based rate limiting method according to an embodiment of the present disclosure.

A flow of a token-bucket-based rate limiting method provided by the embodiment of the present disclosure is shown in FIG. 1, and the method mainly includes the following steps.

Step 201: network node equipment acquires a token bucket parameter according to an attribute of a message.

Specifically, the network node equipment finds the token bucket parameter contained in a message data packet according to an index of the message data packet.

Here, the message is a currently received message or a currently received message data packet; and the attribute of the message may be the index of the message data packet.

The token bucket parameter includes: token_rate representing a token addition rate, time_last representing arrival time of a last message, token_last representing a token amount after rate limiting operation of a token bucket over the last message, and bucket_size representing a token bucket size;

the bucket_size is used to limit the total token amount of the token bucket; for example, if the bucket_size of a token bucket is 100 Mbit, it is indicated that the token bucket may maximally accommodate 100 Mbit tokens, and redundant tokens may overflow from the token bucket.

The last message is a message or message data packet before the currently received message or message data packet.

Step 202: the network node equipment determines a current token amount according to a time threshold (time_threshold) and the token bucket parameter.

Specifically, the network node equipment determines a time difference delta_time according to the arrival time of the last message in the token bucket parameter, determines a token addition delta_token at arrival time of the current message according to the time threshold time_threshold, the time difference delta_time and the token addition rate in the token bucket parameter, and determines the current token amount token_current according to the token addition delta_token at the arrival time of the current message and according to the token amount in the token bucket parameter after the rate limiting operation over the last message is performed.

Here, the time threshold is a value preset according to a practical condition.

The step that the network node equipment determines the time difference delta_time according to the arrival time of the last message in the token bucket parameter is specifically implemented as follows: time_last representing the arrival time of the last message is subtracted from time_now representing the arrival time of the current message to obtain the time different delta_time, that is, delta_time=time_now-time_last;

for example, if timing is started from 0, time_now is 10 ms, time_last is 6 ms, then the time difference delta_time is obtained to be equal to 4 ms by the above algorithm.

The step that the token addition delta_token at the arrival time of the current message is obtained according to the time threshold time_threshold, the time difference delta_time and the token addition rate in the token bucket parameter includes: the time threshold time_threshold and the time difference delta_time are compared, and when the time difference delta_time is larger than the time threshold time_threshold, the token addition delta_token at the arrival time of the current message is equal to a product of the time difference delta_time and the token addition rate token_rate, that is, delta_token=delta_time*token_rate; and when the time difference delta_time is smaller than or equal to the time threshold time_threshold, the token addition delta_token at the arrival time of the current message is equal to 0, that is, delta_token=0.

The reason for adopting the abovementioned method is that the time threshold time_threshold may divide token addition of the token bucket into random block-type addition, that is, tokens are added into the token bucket at a certain time interval (the time interval is larger than the time threshold), and a large number of tokens may be added every time. Therefore, the total token amount of the token bucket after each addition may be kept at a large number, and then no matter whether the currently arriving message is a long packet or a short packet, the total token amount is sufficient to serve the current message, and a long packet may be provided with a token service opportunity the same as a short packet.

The time_threshold may be a preset threshold. The time_threshold may not be set too large because an excessively large time threshold may cause overflow of tokens in the token bucket and loss of a rate limited bandwidth, while the time_threshold may not be set too small because an excessively small time threshold cannot improve the QoS of rate limiting of a long packet. A proper time_threshold is set according to a sending rate of the message and the token addition rate of the token bucket.

For example, the token bucket parameter contained in the message data packet respectively includes: the token addition rate token_rate=8,000 bit/s, the arrival time time_last=6 ms of the last message, the token amount token_last=5,000 bit after the rate limiting operation of the token bucket over the last message, the arrival time 10 ms of the current message and the preset time_threshold=3 ms; then it may be obtained according to the abovementioned method that:

delta_time=4 ms, 4 ms being larger than the time threshold 3 ms; therefore,
delta_token=delta_time*token_rate=0.004 s*8,000 bit/s=32 bit;

the step that the current token amount token_current is obtained according to the token addition delta_token at the arrival time of the current message includes that: the current token amount token_current is equal to a sum of the token amount token_last after the rate limiting operation is performed by the token bucket over the last message and the token addition delta_token at the arrival time of the current message, that is, token_current=token_last+delta_token, and a maximum value of the current token amount token_current is a value of the token bucket size bucket_size, that is, token_current=<bucket_size; a network manager may set the time threshold time_threshold according to a practical condition, so that a value of the current token amount token_current may usually not exceed the value of the token bucket size bucket_size, and when it does, token_current=bucket_size;

for example, in the abovementioned example, token_current=5,000+32=5,032 bit.

Step 203: the network node equipment compares the current token amount and a current message length to obtain a comparison result, and processes the message according to the comparison result.

Specifically, the current token amount token_current is compared with the current message length, and when the current token amount token_current is larger than or equal to the current message length, the current message is forwarded, and the number of token(s) equal to the current message length is subtracted from the token amount token_current of the token bucket; and when the current token amount token_current is smaller than the current message length, the message is dropped, and the token amount of the token bucket is kept unchanged;

for example, in the abovementioned example, when the current token amount token_current is 5,032 bit, if the current message length is 100 bytes, i.e. 800 bit, the message length is smaller than token_current, which indicates that there are sufficient tokens in the token bucket to serve the message, the token bucket forwards the message, 800 bit is subtracted from the token amount of the token bucket, and the current token amount of the token bucket is 4,232 bit; and if the current message length is 1,000 bytes, i.e. 8,000 bit, the length of the message is larger than token_current, which indicates that there are insufficient tokens in the token bucket to serve the message, the message is dropped, and the token amount of the token bucket is still 5,032 bit.

Figure 3:
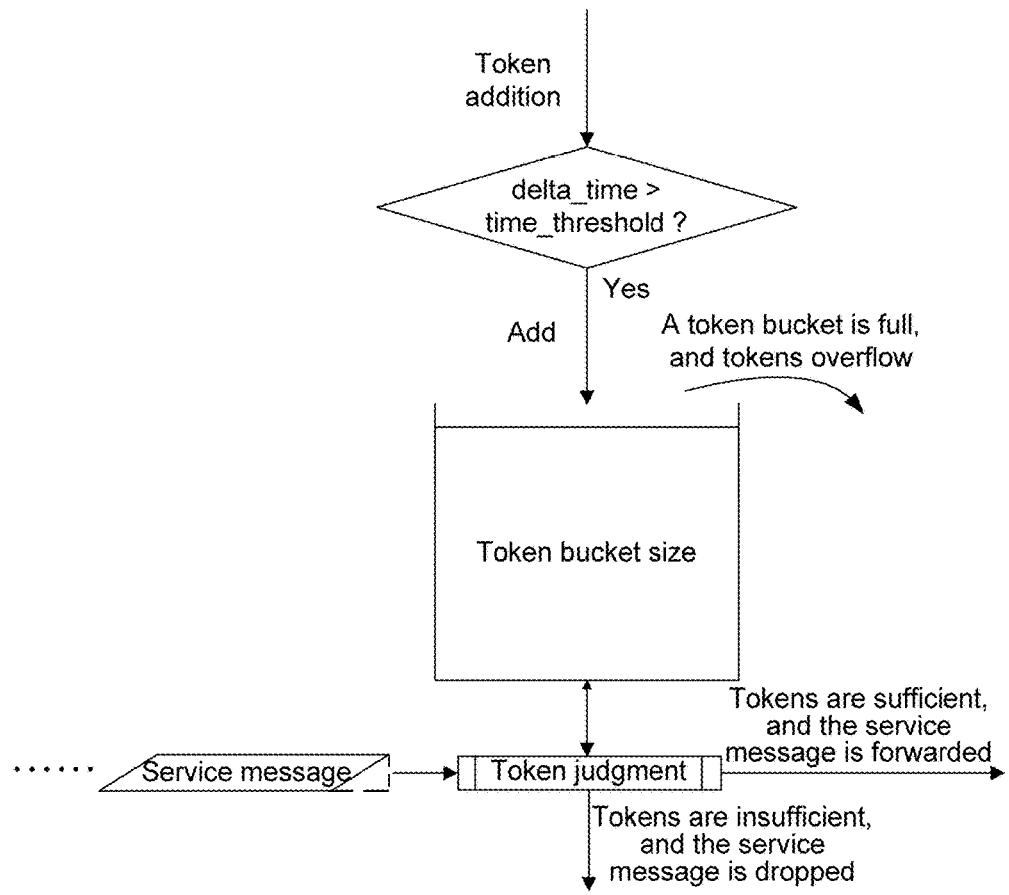
FIG. 3 is a diagram of token-bucket-based rate limiting according to an embodiment of the present disclosure.

FIG. 3 is a diagram of token-bucket-based rate limiting according to an embodiment of the present disclosure. As shown in this figure, when tokens are added into a token bucket, it is judged whether a time difference delta_time is larger than a time threshold time_threshold or not; when the time difference is larger than the time threshold time_threshold, tokens are added into the token bucket, otherwise no tokens are added;

the time difference delta_time is a time difference between arrival time time_now of a current message and arrival time time_last of a last message; the time threshold time_threshold is a preset threshold, and is for random block-type addition of the tokens rather than linear addition;

after the tokens are added into the token bucket, a current token amount token_current of the token bucket is a sum of a token addition delta_token and a token amount token_last after rate limiting operation over the last message is performed; moreover, the current token amount token_current is maximally a total size (bucket_size of the token bucket, that is, when the sum of the token addition delta_token and the token amount token_last after the rate limiting operation over the last message exceeds the total size bucket_size of the token bucket, tokens may overflow from the bucket;

the current message is processed as follows: the current message length and the current token amount token_current are compared; when the current token amount token_current is larger than or equal to the length of the current message, it is indicated that there are sufficient tokens in the token bucket to serve the current message, the message is forwarded, and the number of token(s) equal to the length of the current message is subtracted from the token amount of the token bucket; when the current token amount token_current is smaller than the length of the current message, it is indicated that there are insufficient tokens in the token bucket to serve the current message, the current message is dropped, and the token amount of the token bucket is kept unchanged;

the preset time threshold time_threshold changes addition of the tokens into nonlinear block-type addition; since a large number of tokens may be added every time by such a block-type addition method, equal forwarding opportunities may be provided for long and short message packets, and the problem that a passing opportunity of a short packet is far higher than that of a long packet in an existing token-based rate limiting method is solved;

for example, when the size of the token bucket is 1,500 bytes, the token bucket is full at the start, token-bucket-based rate limiting is performed on a group of messages with different lengths, messages with 60 byes and 1,000 bytes are sent in a mixed manner, a message sending rate is 120 bytes/s and a token addition rate of the token bucket is 100 bytes/s; if an existing linear token-bucket-based rate limiting manner is adopted, the token bucket may enter an "empty" state after a certain period of time, tokens left in the token bucket may only serve the messages with 60 bytes, thus it is impossible for the messages with 1,000 bytes to enjoy any token service for a long time, so that the QoS of the messages with 1,000 bytes may be greatly influenced. The messages with 1,000 bytes may be forwarded through the token bucket only at an initial message sending stage, but cannot enjoy the token service in a later stage, resulting that the passing opportunity of the messages with 60 bytes is far higher than that of the messages with 1,000 bytes. The solution provided by the present disclosure can solve those problems. If the preset time threshold time_threshold is 6 s, tokens are added when a message sending interval is larger than 6 s, otherwise no tokens are added. Such a random block-type addition manner has the advantage that a large number of tokens may be added every time with an addition of larger than 600 bytes, the token amount of the token bucket may be kept at a large cardinal number after each addition, the token bucket may be prevented from being exhausted because of the message sending rate larger than the token addition rate, so that there are sufficient tokens in the token bucket to serve long packets with 1,000 bytes and short packets with 60 bytes, and moreover, equal token service opportunities may be provided for the long packets and the short packets.

Figure 4:
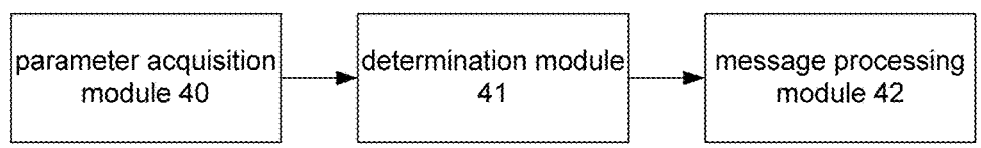
FIG. 4 is a structure diagram of a token-bucket-based rate limiting apparatus according to an embodiment of the present disclosure.
Figure 5:
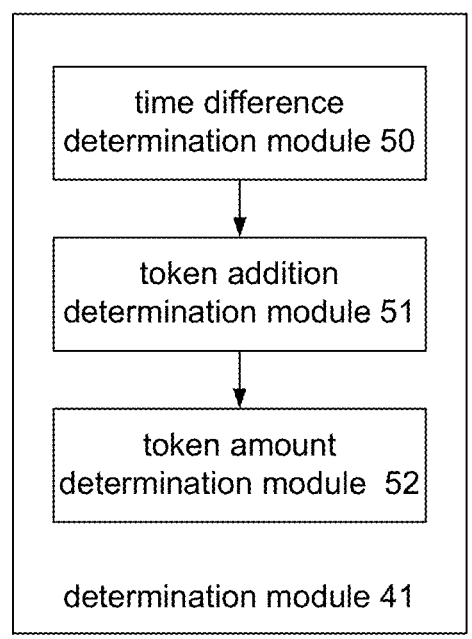
FIG. 5 is a structure diagram of a determination module according to an embodiment of the present disclosure.

FIG. 4 is a structure diagram of a token-bucket-based rate limiting apparatus according to an embodiment of the present disclosure, and the apparatus includes: a parameter acquisition module 40, a determination module 41 and a message processing module 42, wherein the parameter acquisition module 40 is configured to acquire a token bucket parameter according to an attribute of a message;

the determination module 41 is configured to determine a current token amount according to a time threshold and the token bucket parameter;

the message processing module 42 is configured to compare the current token amount with a current message length to obtain a comparison result, and process the message according to the comparison result;

the parameter acquisition module 40 is configured to find the token bucket parameter contained in a message data packet according to an index of the message data packet, wherein the token bucket parameter includes: a token addition rate token_rate, arrival time time_last of a last message, a token amount token_last after rate limiting operation is performed by a token bucket over the last message, and a token bucket size bucket_size;

the token bucket size bucket_size is used to limit the total token amount of the token bucket;

a structure of the determination module 41, as shown in FIG. 5, includes: a time difference determination module 50, a token addition determination module 51 and a token amount determination module 52, wherein the time difference determination module 50 is configured to determine a time difference delta_time according to the arrival time of the last message in the token bucket parameter;

the token addition determination module 51 is configured to determine a token addition delta_token at arrival time of the current message according to the time threshold time_threshold, the time difference delta_time and the token addition rate in the token bucket parameter;

the token amount determination module 52 is configured to determine the current token amount token_current according to the token addition delta_token at the arrival time of the current message and according to the token amount in the token bucket parameter after the rate limiting operation is performed over the last message;

the time difference determination module 50 is configured to subtract the arrival time time_last of the last message from the arrival time time_now of the current message to obtain the time difference delta_time, that is, delta_time=time_now-time_last;

the token addition determination module 51 is configured to compare the time threshold time_threshold and the time difference delta_time; when the time difference delta_time is larger than the time threshold time_threshold, multiply the time difference delta_time and the token addition rate token_rate to obtain the token addition delta_token at the arrival time of the current message, that is, delta_token=delta_time*token_rate; and when the time difference delta_time is smaller than or equal to the time threshold time_threshold, determine that the token addition delta_token at the arrival time of the current message is equal to 0, that is, delta_token=0;

the time threshold time_threshold is a preset threshold;

the token amount determination module 52 is configured to add the token amount token_last after the rate limiting operation is performed by the token bucket over the last message and the token addition delta_token at the arrival time of the current message to obtain the current token amount token_current, that is, token_current=token_last+delta_token, and determine that a maximum value of the current token amount token_current is a value of the token bucket size bucket_size in the token bucket parameter, that is, token_current=<bucket_size;

the message processing module 42 is configured to compare the current token amount token_current with the current message length; when the current token amount token_current is larger than or equal to the current message length, forward the current message, and subtract the number of token(s) equal to the current message length from the current token amount token_current of the token bucket; and when the current token amount token_current is smaller than the current message length, drop the message, and keep the current token amount of the token bucket unchanged;

the parameter acquisition module 40, the determination module 41 and the message processing module 42 may all be implemented by a Central Processing Unit (CPU) or master chip in network node equipment; and the network node equipment includes: equipment such as a router and a switch.

When being implemented in form of software and sold or used as an independent product, token-bucket-based rate limiting method of the embodiment of the present disclosure may also be stored in a computer-readable storage medium. Based on such understanding, those skilled in the art should know that the embodiments of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media including computer-available program codes, the storage media including, but not limited to, a U disk, a mobile hard disk, a Read-Only Memory (ROM), a disk memory, a Compact Disc Read-Only Memory (CD-ROM), an optical memory and the like.

The network node equipment in the embodiments of the present disclosure acquires the token bucket parameter according to an attribute of a message, then obtains a current token amount according to a preset time threshold and the token bucket parameter, compares the current token amount with the length of the current message, and processes the current message according to the comparison result, so that equal token service opportunities may be provided for long and short message packets, the QoS of the long packet may be improved, and the shortcoming of an existing token-bucket-based rate limiting method is overcome.

The above are only the preferred embodiments of the present disclosure and not intended to limit the scope of protection of the present disclosure. Any modifications, equivalent replacements, improvements and the like made within the spirit and principle of the present disclosure shall fall within the scope of protection of the present disclosure.

INDUSTRIAL APPLICABILITY

The present disclosure discloses a token-bucket-based rate limiting method and apparatus, and a computer storage medium. A token bucket parameter may be acquired according to an attribute of a message, a current token amount may be obtained according to a preset time threshold and the token bucket parameter, the current token amount is compared with the length of the current message, and the current message is processed according to a comparison result. In such a manner, the problem that the token bucket is in an "empty" state for a long time may be solved, equal token service opportunities may be provided for long and short message packets, and the QoS of the long packet may be improved.

What is claimed is:

1. A token-bucket-based rate limiting method, comprising:
  acquiring, by network node equipment, a token bucket parameter according to an attribute of a message;
  determining a current token amount according to a time threshold and the token bucket parameter, wherein the time threshold is set according to a sending rate of the message and a token addition rate of the token bucket; and
  comparing the current token amount with a current message length to obtain a comparison result, and processing the message according to the comparison result;
  wherein determining the current token amount according to the time threshold and the token bucket parameter comprises:
  determining, by the network node equipment, a time difference according to arrival time of a last message in the token bucket parameter;
  determining a token addition at the arrival time of the current message according to the time threshold, the time difference and the token addition rate in the token bucket parameter; and
  determining the current token amount according to the token addition at the arrival time of the current message and according to a token amount in the token bucket parameter after rate limiting operation is performed over the last message;
  wherein determining the token addition at the arrival time of the current message according to the time threshold and the time difference comprises:
  comparing the time threshold with the time difference;
    when the time difference is larger than the time threshold, determining that the token addition at the arrival time of the current message is equal to a product of the time difference and the token addition rate; and
    when the time difference is smaller than or equal to the time threshold, determining that the token addition at the arrival time of the current message is equal to 0.

2. The method according to claim 1, wherein acquiring, by the network node equipment, the token bucket parameter according to the attribute of the message comprises:
  finding, by the network node equipment, the token bucket parameter contained in a message data packet according to an index of the message data packet;
  wherein the token bucket parameter comprises: the token addition rate, the arrival time of the last message, the token amount after rate limiting operation is performed by the token bucket over the last message, and a token bucket size.

3. The method according to claim 2, wherein comparing the current token amount with the current message length to obtain the comparison result and processing the message according to the comparison result comprises:
  comparing the current token amount with the current message length;
    when the current token amount is larger than or equal to the current message length, forwarding the current message, and subtracting the number of token(s) equal to the current message length from the current token amount of a token bucket; and
    when the current token amount is smaller than the current message length, dropping the message, and keeping the current token amount of the token bucket unchanged.

4. The method according to claim 1, wherein determining, by the network node equipment, the time difference comprises:

subtracting the arrival time of the last message from the arrival time of the current message to obtain the time difference.

5. The method according to claim 4, wherein comparing the current token amount with the current message length to obtain the comparison result and processing the message according to the comparison result comprises:
comparing the current token amount with the current message length;
when the current token amount is larger than or equal to the current message length, forwarding the current message, and subtracting the number of token(s) equal to the current message length from the current token amount of a token bucket; and
when the current token amount is smaller than the current message length, dropping the message, and keeping the current token amount of the token bucket unchanged.

6. The method according to claim 1, wherein determining the current token amount according to the token addition at the arrival time of the current message comprises:
determining that the current token amount is equal to a sum of the token amount after the rate limiting operation is performed by the token bucket over the last message and the token addition at the arrival time of the current message, and determining that a maximum value of the current token amount is the token bucket size in the token bucket parameter.

7. The method according to claim 6, wherein comparing the current token amount with the current message length to obtain the comparison result and processing the message according to the comparison result comprises:
comparing the current token amount with the current message length;
when the current token amount is larger than or equal to the current message length, forwarding the current message, and subtracting the number of token(s) equal to the current message length from the current token amount of a token bucket; and
when the current token amount is smaller than the current message length, dropping the message, and keeping the current token amount of the token bucket unchanged.

8. The method according to claim 1, wherein comparing the current token amount with the current message length to obtain the comparison result and processing the message according to the comparison result comprises:
comparing the current token amount with the current message length;
when the current token amount is larger than or equal to the current message length, forwarding the current message, and subtracting the number of token(s) equal to the current message length from the current token amount of a token bucket; and
when the current token amount is smaller than the current message length, dropping the message, and keeping the current token amount of the token bucket unchanged.

9. A token-bucket-based rate limiting apparatus, comprising: a parameter acquisition module, a determination module and a message processing module, wherein
the parameter acquisition module is configured to acquire a token bucket parameter according to an attribute of a message;
the determination module is configured to determine a current token amount according to a time threshold and the token bucket parameter, wherein the time threshold is set according to a sending rate of the message and a token addition rate of the token bucket; and
the message processing module is configured to compare the current token amount with a current message length to obtain a comparison result, and process the message according to the comparison result;
wherein the determination module comprises: a time difference determination module, a token addition determination module and a token amount determination module, wherein
the time difference determination module is configured to determine a time difference according to arrival time of a last message in the token bucket parameter;
the token addition determination module is configured to determine a token addition at the arrival time of the current message according to the time threshold, the time difference and the token addition rate in the token bucket parameter; and
the token amount determination module is configured to determine the current token amount according to the token addition at the arrival time of the current message and according to a token amount in the token bucket parameter after rate limiting operation is performed over the last message;
wherein the token addition determination module is further configured to compare the time threshold with the time difference; when the time difference is larger than the time threshold, multiply the time difference and the token addition rate to obtain the token addition at the arrival time of the current message, and when the time difference is smaller than or equal to the time threshold, determine that the token addition at the arrival time of the current message is equal to 0.

10. The apparatus according to claim 9, wherein the parameter acquisition module is configured to find the token bucket parameter contained in a message data packet according to an index of the message data packet, wherein the token bucket parameter comprises: the token addition rate, the arrival time of the last message, the token amount after rate limiting operation is performed by the token bucket over the last message, and a token bucket size.

11. The apparatus according to claim 9, wherein the time difference determination module is configured to subtract the arrival time of the last message from the arrival time of the current message to obtain the time difference.

12. The apparatus according to claim 9, wherein the token amount determination module is configured to add the token amount after the rate limiting operation is performed by the token bucket over the last message and the token addition at the arrival time of the current message to obtain the current token amount, and determine that a maximum value of the current token amount is the token bucket size in the token bucket parameter.

13. The apparatus according to claim 9, wherein the message processing module is configured to compare the current token amount with the current message length; when the current token amount is larger than or equal to the current message length, forward the current message, and subtract the number of token(s) equal to the current message length from the current token amount of a token bucket; and when the current token amount is smaller than the current message length, drop the message, and keep the current token amount of the token bucket unchanged.

14. A non-transitory computer storage medium, having stored computer-executable instructions for executing a token-bucket-based rate limiting method which comprises:

acquiring, by network node equipment, a token bucket parameter according to an attribute of a message;

determining a current token amount according to a time threshold and the token bucket parameter, wherein the time threshold is set according to a sending rate of the message and a token addition rate of the token bucket; and comparing the current token amount with a current message length to obtain a comparison result, and processing the message according to the comparison result;

wherein determining the current token amount according to the time threshold and the token bucket parameter comprises:

determining, by the network node equipment, a time difference according to arrival time of a last message in the token bucket parameter;

determining a token addition at the arrival time of the current message according to the time threshold, the time difference and the token addition rate in the token bucket parameter; and determining the current token amount according to the token addition at the arrival time of the current message and according to a token amount in the token bucket parameter after rate limiting operation is performed over the last message;

wherein determining the token addition at the arrival time of the current message according to the time threshold and the time difference comprises:

comparing the time threshold with the time difference;

when the time difference is larger than the time threshold, determining that the token addition at the arrival time of the current message is equal to a product of the time difference and the token addition rate; and when the time difference is smaller than or equal to the time threshold, determining that the token addition at the arrival time of the current message is equal to 0.

* * * * *